US011220292B2

(12) United States Patent
Watanabe et al.

(10) Patent No.: US 11,220,292 B2
(45) Date of Patent: Jan. 11, 2022

(54) VEHICLE REAR STRUCTURE

(71) Applicant: HONDA MOTOR CO., LTD., Tokyo (JP)

(72) Inventors: Ukyo Watanabe, Wako (JP); Takashi Yamada, Wako (JP); Satoru Noguchi, Wako (JP); Takehiko Koshiishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 101 days.

(21) Appl. No.: 16/633,239

(22) PCT Filed: Aug. 29, 2017

(86) PCT No.: PCT/JP2017/030832
§ 371 (c)(1),
(2) Date: Jan. 23, 2020

(87) PCT Pub. No.: WO2019/043770
PCT Pub. Date: Mar. 7, 2019

(65) Prior Publication Data
US 2020/0172167 A1    Jun. 4, 2020

(51) Int. Cl.
*B62D 21/02* (2006.01)
*B62D 25/02* (2006.01)
(Continued)

(52) U.S. Cl.
CPC ........... *B62D 21/02* (2013.01); *B62D 21/155* (2013.01); *B62D 25/025* (2013.01);
(Continued)

(58) Field of Classification Search
CPC ...... B62D 21/02; B62D 21/15; B62D 25/025; B62D 25/2027; B62D 25/2036; B62D 27/02; B62D 21/11; B62D 25/08
(Continued)

(56) References Cited

U.S. PATENT DOCUMENTS

2006/0197300 A1*    9/2006    Nakashima ........ B62D 25/2036
                                                      280/124.109
2016/0052556 A1     2/2016    Kano et al.

FOREIGN PATENT DOCUMENTS

JP    H07-96760 A       4/1995
JP    2005-047492 A     2/2005
(Continued)

OTHER PUBLICATIONS

International Search Report by ISA/JP dated Oct. 10, 2017, on PCT/JP2017/030832, 3 pages.
(Continued)

*Primary Examiner* — D Glenn Dayoan
*Assistant Examiner* — Dana D Ivey
(74) *Attorney, Agent, or Firm* — Rankin, Hill & Clark LLP

(57) ABSTRACT

A vehicle rear structure includes: a rear sideframe disposed on either side in a rear of a vehicle body; and a rear subframe disposed under the rear sideframe, wherein a rear end of the rear subframe is disposed at the same position in the longitudinal direction as, or at a position posterior to, a rear end of the rear sideframe. The vehicle rear structure has better performance in transmitting an impact load at a rear impact with a vehicle than ever, to further improve performance in absorbing impact energy.

5 Claims, 3 Drawing Sheets

(51) Int. Cl.
   *B62D 25/20* (2006.01)
   *B62D 21/15* (2006.01)
   *B62D 27/02* (2006.01)
   B62D 25/08 (2006.01)
   B62D 21/11 (2006.01)
(52) U.S. Cl.
   CPC ..... *B62D 25/2027* (2013.01); *B62D 25/2036* (2013.01); *B62D 27/02* (2013.01); B62D 21/11 (2013.01); B62D 25/08 (2013.01)
(58) Field of Classification Search
   USPC .................................................. 296/193.08
   See application file for complete search history.

(56) References Cited

FOREIGN PATENT DOCUMENTS

| | | | |
|---|---|---|---|
| JP | 2010-013053 | A | 1/2010 |
| JP | 2016-043829 | A | 4/2016 |
| JP | 2016-052862 | A | 4/2016 |
| JP | 2017-019458 | A | 1/2017 |
| JP | 2018-188022 | A | 11/2018 |
| JP | 2018188022 | A * | 11/2018 |

OTHER PUBLICATIONS

Written Opinion by ISA/JP dated Oct. 10, 2017, on PCT/JP2017/030832, 4 pages.
Office Action received in corresponding Japanese application No. 2019-538775 dated Jan. 12, 2021 with English translation (6 pages).
International Preliminary Report on Patentability by IPEA/JP dated Dec. 17, 2019, on PCT/JP2017/030832 and English translation thereof, 22 pages.

\* cited by examiner

VEHICLE REAR STRUCTURE

TECHNICAL FIELD

The present invention relates to a vehicle rear structure of an automobile.

BACKGROUND ART

A vehicle rear structure is conventionally known to have a rear subframe, on which a drive unit and the like are mounted, joined to bottoms of rear sideframes connected to rear ends of side sills, and diagonal members extending obliquely forward, and inwardly in the vehicle width direction, from the rear sideframes (see Japanese Patent Application Publication No, 2016-52862 A, for example). This vehicle rear structure has a front end of each of the diagonal members connected to a cross member, which is spanned between the rear sideframes, at the midpoint in the vehicle width direction thereof. The vehicle rear structure further includes brackets extending downward from connection portions between the diagonal members and the cross member, and the brackets are joined to a battery frame With this vehicle rear structure, if a load at a rear impact with a vehicle (impact load) is inputted to the rear sideframes, the impact load is transmitted from the rear sideframes to the side sills. The impact load is also transmitted from the rear sideframes to the battery frame via the diagonal members and the brackets. Additionally the rear subframe joined to the rear sideframes suppresses deformation of the rear sideframes inputted with the impact load. This structure allows the rear sideframes to efficiently transmit the impact load to the side sills and the battery frame. As a result, the vehicle rear structure has improved performance in absorbing impact energy.

SUMMARY OF THE INVENTION

Problems to be Solved

However, even though the rear subframe of the conventional vehicle rear structure (see Japanese Patent Application Publication No. 2016-52862 A, for example) suppresses deformation of the rear sideframes, the rear subframe itself does not work sufficiently as a load transmitting member to actively transmit the impact load forward in a vehicle body.

The present invention is intended to provide a vehicle rear structure having better performance in transmitting an impact load at a rear impact with a vehicle than ever, to further improve performance in absorbing impact energy.

Solution to Problem

A vehicle rear structure to solve the problem includes: a rear sideframe disposed on either side in the rear of a vehicle body; and a rear subframe disposed under the rear sideframe, wherein a rear end of the rear subframe is disposed at the same position in a longitudinal direction as, or at a position posterior to, a rear end of the rear sideframe.

Advantageous Effects of the Invention

According to the present invention, a vehicle rear structure is provided that has better performance in transmitting the impact load at a rear impact with a vehicle than ever, to further improve performance in absorbing impact energy.

EMBODIMENTS OF THE INVENTION

In a vehicle rear structure of an embodiment of the present invention, a rear end of a rear subframe disposed under rear sideframes is disposed at the same position in the longitudinal direction as, or at a position posterior to, rear ends of the rear sideframes. Hereinafter, the present invention is described in detail by way of an example of a vehicle rear structure applied to an electric vehicle, a plug-in hybrid vehicle, or the like on which a battery for a drive unit is mounted. However, the present invention is not limited thereto and can also be applied to various vehicles having at least rear sideframes and a rear subframe.

Figure 1:
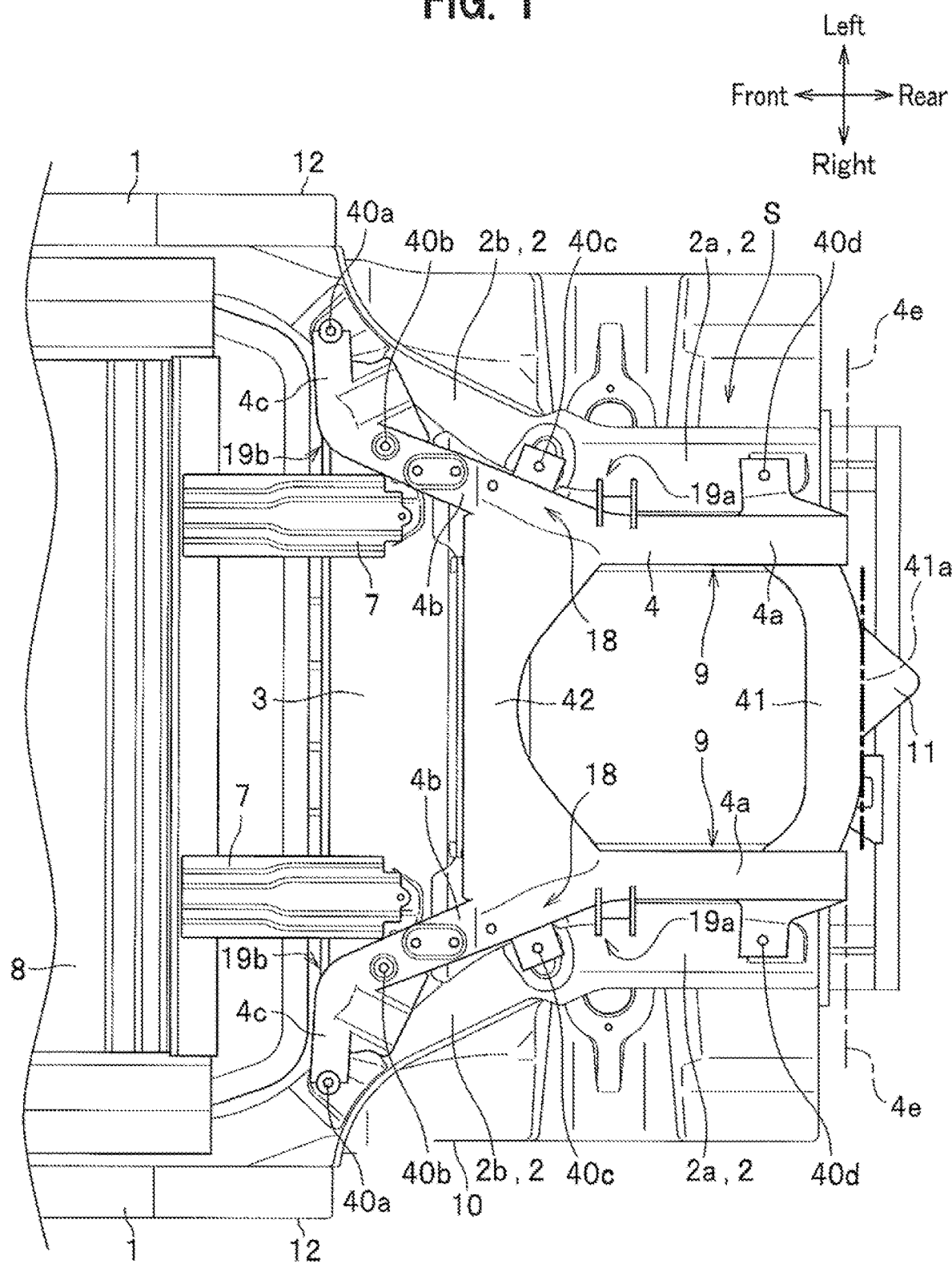
FIG. 1 is a rear bottom view of a vehicle having a vehicle rear structure of the present embodiment.
Figure 2:
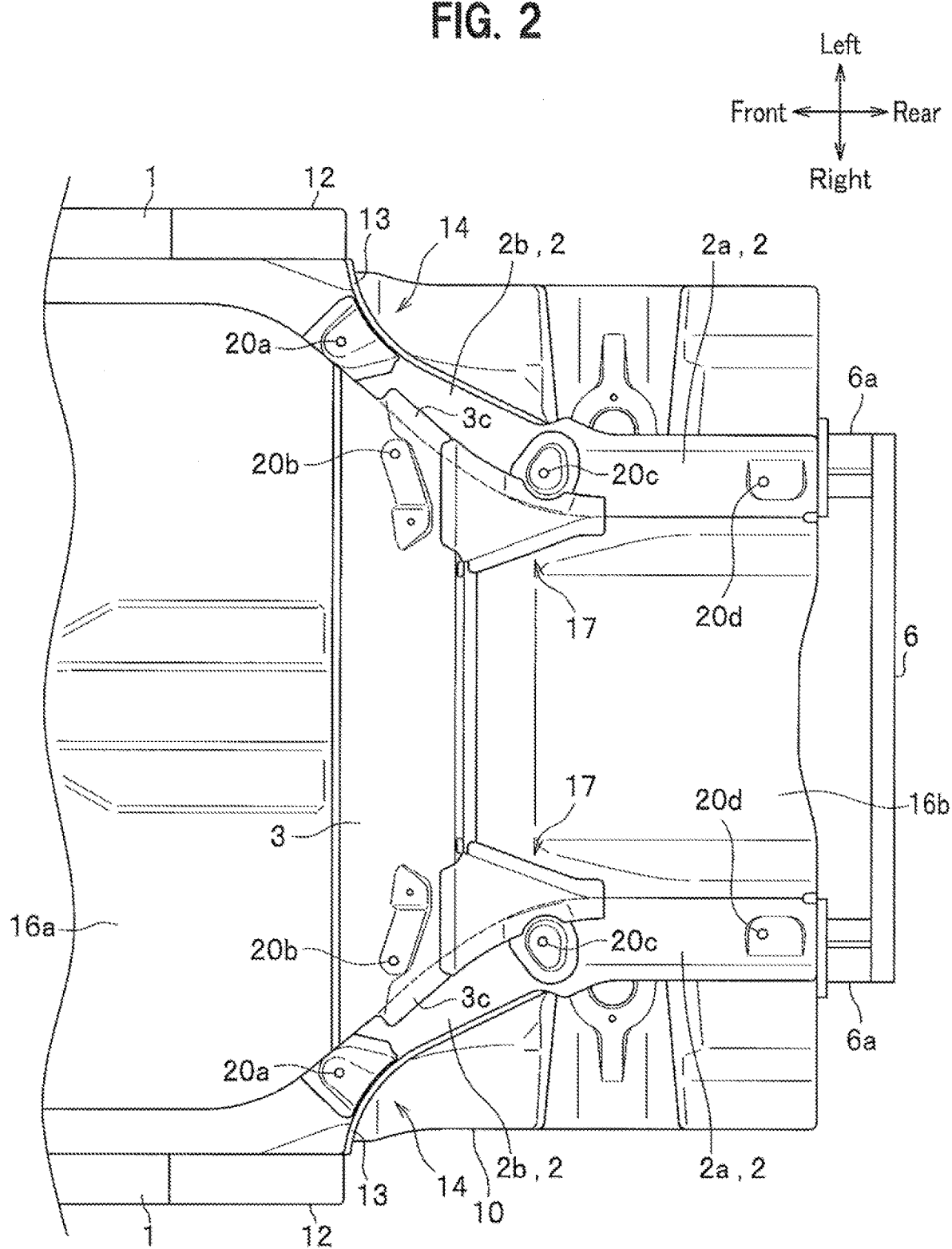
FIG. 2 is a rear bottom view of the vehicle in FIG. 1, with a rear subframe, a battery case, and brackets excluded.
Figure 3:
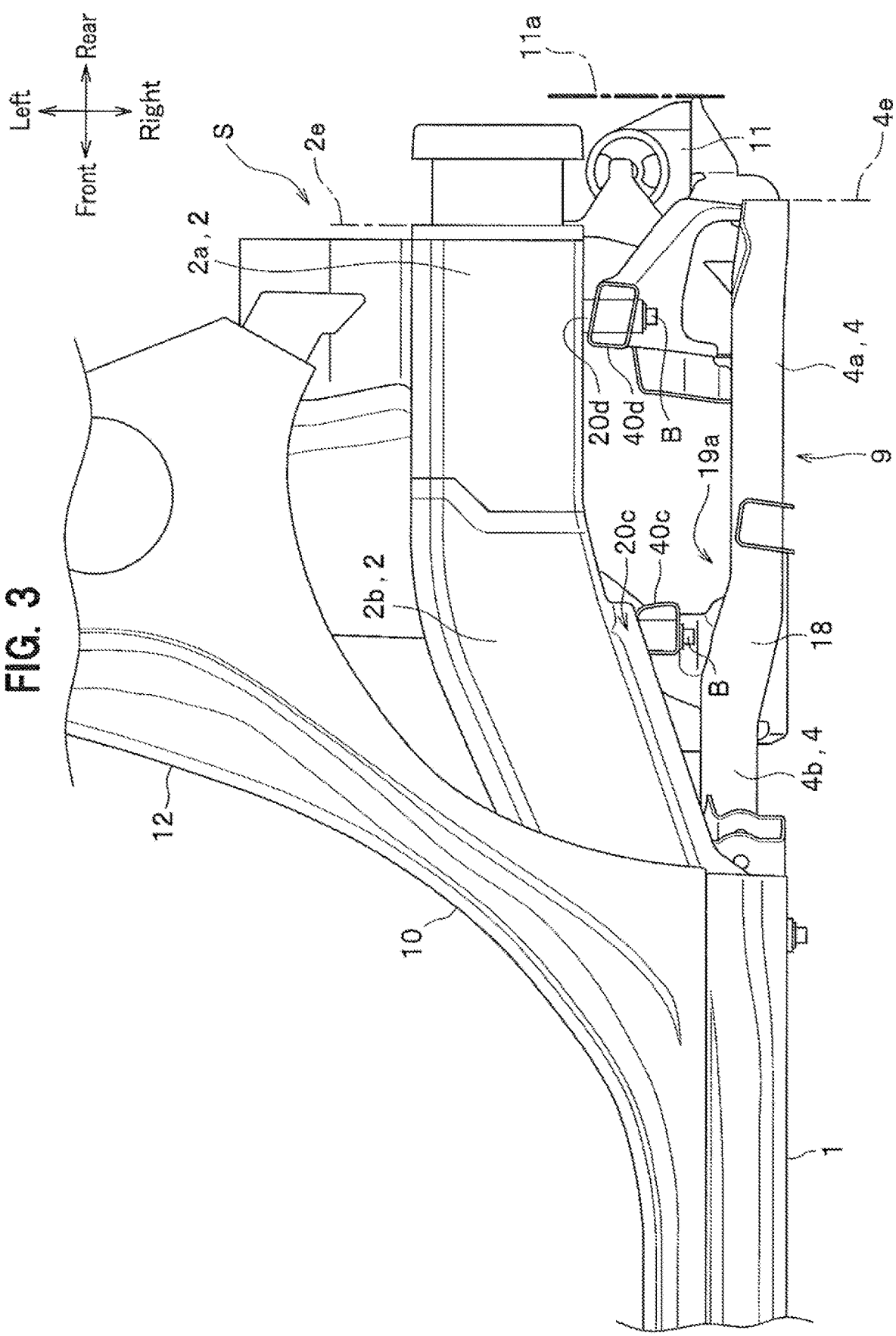
FIG. 3 is a rear left side view of the vehicle having the vehicle rear structure of the present embodiment.

FIG. 1 is a rear bottom view of a vehicle 12 having a vehicle rear structure S of the present embodiment. FIG. 2 is a rear bottom view of the vehicle 12 in FIG. 1, with a rear subframe 4, a battery case 8, and brackets 7 excluded. FIG. 3 is a rear left side view of the vehicle 12 having the vehicle rear structure S of the present embodiment. Up-down, front-rear, and right-left directions in the following description are directions as viewed from a driver seated in the vehicle 12. Note that the right-left direction coincides with a vehicle width direction.

As shown in FIG. 1, the vehicle rear structure S of the present embodiment includes side sills 1 extending in the longitudinal direction on either side of a vehicle body 10, rear sideframes 2 extending rearward from rear ends of the side sills 1, and a rear cross member 3 connecting inclined portions 2b of the rear sideframes 2, to be described below, with each other, and the rear subframe 4 disposed under the rear sideframes 2.

<Side Sill>

The side sill 1 has an inner side sill (not shown) connected with an outer side sill (not shown), respectively disposed inside and outside in the vehicle width direction, so as to define a hollow and a side sill stiffener (not shown) is arranged in the hollow. The side sill 1 extends forward to the vicinity of a lower dashboard in the front of the vehicle body 10, although not shown.

<Rear Sideframe>

The rear sideframe 2 is disposed on either side in the rear of the vehicle body 10, as shown in FIG. 2. The rear sideframe 2 mainly includes a front-rear portion 2a (first front-rear portion) and an inclined portion 2b (first inclined portion).

The front-rear portion 2a is disposed directly behind the inclined portion 2b to be described next, to extend in the longitudinal direction on the inner side in the vehicle width direction with respect to the side sill 1. Specifically, the front-rear portion 2a is substantially parallel to the axle and extends substantially horizontally. Note that the front-rear portion 2a in the present embodiment extends in the longitudinal direction, with a substantially constant width as viewed from the bottom. The front-rear portion 2a has a structure having a closed cross-section in a substantially rectangular shape, although not shown. Front surfaces, at both ends in the vehicle width direction, of a bumper beam 6 extending in the vehicle width direction are connected via bumper beam extensions 6a to rear ends of the front-rear portions 2a.

The inclined portion 2b is connected to a front end of the front-rear portion 2a and extends at an angle so as to be gradually displaced outward in the vehicle width direction, as extending forward from the front end of the front-rear portion 2a. The inclined portion 2b in the present embodiment has a hat shape to open outward in the vehicle width direction in a cross-sectional view, although not shown. The inclined portion 2b has upper and lower flanges (not shown), which correspond to flange portions of a hat shape, connected to an inner surface in the vehicle width direction of a wheel arch 13 by welding or the like.

The inclined portion 2b connected to the wheel arch 13 defines a closed cross-section in a substantially rectangular shape, in combination with the wheel arch 13. The inclined portion 2b has a front end portion thereof disposed so as to overlap in the longitudinal direction, and be connected, with a rear end portion of the side sill 1 on the inner side in the vehicle width direction of the side sill 1.

As shown in FIG. 3, the inclined portion 2b extends at an angle so as to be gradually positioned higher, as extending rearward from a connection portion with the side sill 1, to have a rear end thereof connected to a front end of the front-rear portion 2a. That is, the front-rear portion 2a is disposed at a higher level than the side sill 1.

Returning to FIG. 2, the inclined portion 2b in the present embodiment has a constricted portion 14 formed at a front end thereof. The constricted portion 14 is formed with the inclined portion 2b extending toward the side sill 1 from an end portion thereof next to the front-rear portion 2a so as to have a lateral width (width in the direction perpendicular to the extending direction) thereof gradually narrowed, but in mid-course inversely starting to have the lateral width gradually widened until reaching the connection portion with the side sill 1. The constricted portion 14 is formed to have the outer edge in the vehicle width direction of the inclined portion 2b recessed in an arc shape, diagonally forward and inward in the vehicle width direction, at a position adjacent to the connection portion with the side sill 1.

The rear sideframe 2 with such a feature is formed with a first attachment portion 20a, a third attachment portion 20c, and a fourth attachment portion 20d to the rear subframe 4 (see FIG. 1) to be described below. These attachment portions 20a, 20c, and 20d will be described in detail below. In FIG. 2, a reference numeral 16a indicates a front floor panel, and a reference numeral 16b indicates a rear floor panel.

<Rear Cross Member>

The rear cross member 3 extends in the vehicle width direction under the lower surface of the rear floor panel 16b so as to be installed across the rear sideframes 2, as shown in FIG. 2. The rear cross member 3 has a hat shape in a cross-sectional view to open upward, although not shown. That is, the rear cross member 3 includes a bottom wall, a front wall rising upward from a front edge of the bottom wall, a rear wall rising upward from a rear edge of the bottom wall, and a front flange and a rear flange defining flange portions of a hat shape.

The front flange and the rear flange are connected to the lower surface of the rear floor panel 16a by welding or the like. Thus, the rear cross member 3 connected to the rear floor panel 16b defines a substantially rectangular closed section in combination with the rear floor panel 16b.

The rear cross member 3 is connected at both ends thereof in the vehicle width direction to the inclined portions 2b of the rear sideframes 2 by welding or the like. Specifically, connection flanges 3c provided at both ends of the rear cross member 3 are connected to the lower surfaces of the rear sideframes 2 by welding or the like. The rear cross member 3 in the present embodiment connects the constricted portions 14 of the rear sideframes 2 with each other.

A gusset 17 is disposed at a corner between the rear cross member 3 and the rear sideframe 2. The gusset 17 has a substantially triangular shape in a bottom view to connect the rear cross member 3 with the rear sideframe 2.

Returning to FIG. 1, the battery case 8 in a substantially rectangular shape in a bottom view is disposed in front of the rear cross member 3, to house a secondary battery, such as a lithium ion battery, or the like. The battery case 8 is disposed under the front floor panel 16a (see FIG. 2) and between the side sills 1. The rear cross member 3 supports the rear end of the battery case 8 via the brackets 7. Note that the battery case 8 in the present embodiment is mainly supported by the side sills 1 via given battery case mounting frames (not shown).

<Rear Subframe>

Next, the rear subframe 4 (see FIG. 1) is described. The rear subframe 4 in the present embodiment is mounted thereon with a drive unit (not shown) of the vehicle 12. As shown in FIG. 1, the rear subframe 4 includes a front-rear portion 4a (second front-rear portion) extending in the longitudinal direction in the rear of the vehicle body 10, and an inclined portion 4b (second inclined portion) extending at an angle so as to be displaced outward in the vehicle width direction, as extending frontward from the front end of the front-rear portion 4a. That is, the rear subframe 4 has a bent portion 19a (inflection point) between the front-rear portion 4a and the inclined portion 4b.

The front-rear portion 4a extends along (substantially in parallel to) the front-rear portion 2a (first front-rear portion), in a bottom view of the vehicle body 10, on the inner side in the vehicle width direction of the rear sideframe 2. Likewise, the inclined portion 4b extends along (substantially in parallel to) the inclined portion 2b (first inclined portion), in a bottom view of the vehicle body 10, on the inner side in the vehicle width direction of the rear sideframe 2. The front-rear portion 4a and the inclined portion 4b are integrally connected to each other to form a side member 9 of the rear subframe 4.

As shown in FIG. 3, a rear end 4e of the side member 9 (front-rear portion 4a) in the present embodiment is located posterior to a rear end 2e of the rear sideframe 2 (front-rear portion 2a). However, the rear end 4e of the side member 9 (front-rear portion 4a) may be disposed at the same position in the longitudinal direction as, or at a position posterior to, the rear end 2e of the rear sideframe 2 (front-rear portion 2a). Then, the rear end 4e of the side member 9 (front-rear portion 4a) can be set to have the same position in the longitudinal direction as the rear end 2e of the rear sideframe 2 (front-rear portion 2a).

The front-rear portion 4a of the side member 9 extends substantially parallel to the front-rear portion 2a of the rear sideframe 2, in a side view of the vehicle body 10. The inclined portion 4b of the side member 9 obliquely extends with a slightly rising slope frontward from the bent portion 19a (inflection point) as a base end (rear end), in a side view of the vehicle body 10, and extends forward so as to be bent in the middle of the extension to become substantially parallel to the front-rear portions 2a. That is, the side member 9 has a sloped portion 18 to connect a front portion thereof with a rear portion thereof having a difference in level.

The side member 9 with such a feature is supported by a lower portion of the rear sideframe 2. Specifically, the side member 9 is supported by the rear sideframe 2 so as to have the same height as the side sill 1 in a side view of the vehicle body 10. That is, the front-rear portion 4a (second front-rear portion) and inclined portion 4b (second inclined portion) of the side member 9 are disposed to have the same height as the side sill 1.

Note that the above-described wording of "the side member 9 (the front-rear portion 4a and the inclined portion 4b) having the same height as the side sill 1" means that the side member 9 (the front-rear portion 4a and the inclined portion 4b) at least partly overlaps with the imaginal extension of the side sill 1. Therefore, the wording does not necessarily mean that the heights of the side member 9 (the front-rear portion 4a and the inclined portion 4b) and the side sill 1 are absolutely the same with each other.

Returning to FIG. 1, the side member 9 extends to the front edge of the rear cross member 3. Besides, the side member 9 further includes an extended portion 4c in the front thereof. The extended portion 4c extends outerward in the vehicle width direction from the front end of the inclined portion 4b, along the front edge of the rear cross member 3. That is, a bent portion 19b is formed between the extended portion 4c and the inclined portion 4b.

The front end of the extended portion 4c is located at the constricted portion 14 (see FIG. 2) of the rear sideframe 2. The extended portion 4c has a first connection portion 40a formed in the front end thereof at a position corresponding to the first attachment portion 20a (see FIG. 2) formed in the constricted portion 14. The inclined portion 4b has a second connection portion 40b formed in the front thereof at a position corresponding to a second attachment portion 20b (see FIG. 2) of the rear cross member 3. That is, the first connection portion 40a and the second connection portion 40b are formed at positions to have the bent portion 19b therebetween.

The inclined portion 4b has a third connection portion 40c formed in the rear thereof at a position corresponding to the third attachment portion 20c (see FIG. 2) of the rear sideframe 2. The third connection portion 40c is formed at a position corresponding to a joining section between a rear portion of the inclined portion 4b and a cross beam 42.

The front-rear portion 4a has a fourth connection portion 40d formed in the rear thereof at a position corresponding to the fourth attachment portion 20d (see FIG. 2) of the rear sideframe 2. Note that the fourth attachment portion 20d is formed in the rear of the front-rear portion 2a of the rear sideframe 2, as shown in FIG. 2. The fourth connecting portion 40d is formed at a position corresponding to a joining section between a rear portion of the front-rear portions 4a and a cross beam 41 to be described below. That is, the fourth connection portion 40d and the third connection portion 40c are formed at positions to have the bent portion 19a (inflection point) of the side member 9 therebetween. As a result, the rear sideframe 2 is joined to the side member 9 of the rear subframe 4 at positions to have the bent portion 19a (inflection point) therebetween in the longitudinal direction.

Additionally, the third connection portion 40c and fourth connection portion 40d of the rear subframe 4 are respectively attached by bolts B to the third attachment portion 20c and fourth attachment portion 20d of the rear sideframe 2, as shown in FIG. 3. In addition, the first connection portion 40a (see FIG. 1) is attached to the first attachment portion 20a (see FIG. 2) via the bolt and the second connection portion 40b (see FIG. 1) is attached to the second attachment portion 20b (see FIG. 2) of the rear cross member 3 (see FIG. 2), although not shown.

Returning to FIG. 1, the cross beam 41 (rear member) joins the rear portions of the front-rear portions 4a to each other. The cross beam 41 is formed of a curved member disposed so as to be convex rearward in a bottom view of the vehicle body 10. As a result, the cross beam 41 has a rear end 41a defined at a center portion in the vehicle width direction located posterior to both ends thereof to be connected with the front-rear portions 4a. The rear end 41a of the cross beam 41 is located posterior to the rear end 4e of the side member 9.

In addition, the cross beam 41 is formed with a mount portion 11 to support a drive unit (not shown) of the vehicle 12 at the center in the vehicle width direction thereof. The mount portion 11 is disposed on the cross beam 41 so as to protrude more rearward than the center portion in the vehicle width direction of the cross beam 41 to define the rear end 41a. That is, as shown in FIG. 3, the rear end 11a of the mount portion 11 in the present embodiment is located posterior to the rear end 4e of the side member 9.

Returning to FIG. 1, the cross beam 42 is disposed in front of the cross beam 41 so as to join the rear portions of the inclined portions 4b to each other. The cross beam 42 is formed to have the front edge formed substantially parallel to the rear cross member 3 and the rear edge recessed forward at the center portion in the vehicle width direction, in a bottom view of the vehicle body 10. That is, the cross beam 42 is formed to have the joined section with the inclined portion 4b being wider in the longitudinal direction than the center portion in the vehicle width direction. Specifically, the cross beam 42 is joined to the inclined portion 4b so as to overlap with the sloped portion 18 of the side member 9.

Advantageous Effects

Next, advantageous effects of the vehicle rear structure S of the present embodiment are demonstrated. In the vehicle rear structure S of the present embodiment, the rear end of the rear subframe 4 (see FIG. 3) is located at the same position in the longitudinal direction as, or at a position posterior to, the rear end of the rear sideframe 2 (see FIG. 3).

In the vehicle rear structure S with such a feature, when the bumper beam 6 and the bumper beam extensions 6a are crushed to have an impact load inputted to the rears end of the rear sideframes 2 at a rear impact with a vehicle, for example, the impact load is in putted to the rear end of the rear subframe 4 ahead of, or substantially at the same time as, the rear sideframes 2. Accordingly, in the vehicle rear structure S, both the rear sideframes 2 and the rear subframe 4 actively transmit the impact load frontward in the vehicle body 10. The vehicle rear structure S with such a feature further improves performance in absorbing impact energy, as compared with a conventional vehicle rear structure (see Japanese Patent Application Publication No 2016-52862 A, for example) in which a rear subframe fails to work sufficiently as a load transmitting member for an Impact load.

In addition, in the vehicle rear structure S of the present embodiment, the front-rear portion 4a (second front-rear portion) of the rear subframe 4 extends along the front-rear portion 2a (first front-rear portion) of the rear sideframe 2, as shown in FIG. 1, in a bottom view of the vehicle body 10. The inclined portion 4b (second inclined portion) of the rear subframe 4 also extends along the inclined portion 2b (first inclined portion) of the rear sideframe 2.

In the vehicle rear structure S with such a feature, the rear sideframes 2 and the rear subframe 4 can transmit an impact load substantially evenly from the rear frontward. Then, the vehicle rear structure S allows for preventing either the rear sideframes 2 or the rear subframe 4 from being bent and deformed ahead of the other of the two when an impact load is inputted. That is, the vehicle rear structure S actively transmits an impact load to the front of the vehicle body 10, by both the rear sideframes 2 and the rear subframe 4 so as to be more efficient.

Further, in the vehicle rear structure S of the present embodiment, the front-rear portion 4a (second front-rear portion) of the rear subframe 4 is joined to the front-rear portion 2a (first front-rear portion) of the rear sideframe 2, as shown in FIG. 1. Likewise, the inclined portion 4b (second inclined portion) of the rear subframe 4 is joined to the inclined portion 2b (first inclined portion) of the rear sideframe 2.

In the vehicle rear structure S, the bent portion 19a (inflection point) is formed between the front-rear portion 4a (second front-rear portion) and inclined portion 4b (second inclined portions) of the rear subframe 4. The rear sideframes 2 are joined to the rear subframe 4 at positions having the bent portions 19a therebetween in the longitudinal direction. The vehicle rear structure S with such a feature allows for preventing the rear subframe 4 from being bent at the bent portions 19a (inflection points) when an impact load is inputted. That is, the vehicle rear structure S actively transmits an impact load to the front of the vehicle body 10, by both the rear sideframes 2 and the rear subframe 4 for more reliablity.

Still further, in the vehicle rear structure S of the present embodiment, the front-rear portions 2a (first front-rear portion) of the rear sideframe 2 is disposed above the side sill 1 in a side view of the vehicle body 10, as shown in FIG. 3. In contrast, the front-rear portion 4a (second front-rear portion) and inclined portion 4b (second inclined portion) of the rear subframe 4 are disposed at the same height as the side sill 1, in a side view of the vehicle body 10.

In the vehicle rear structure S with such a feature, the rear subframe 4 is inputted with an impact load at the same height as the side sill 1 at a rear impact with a vehicle, for example. This leads to the vehicle rear structure S preventing the front-rear portions 4a (second front-rear portions) and the inclined portions 4b (second inclined portions) from being bent in the up-down direction. That is, the vehicle rear structure S actively transmits an impact load to the front of the vehicle body 10, by both the rear sideframes 2 and the rear subframe 4 for more reliablity.

Still further, in the vehicle rear structure of the present embodiment, each of the side members 9 of the rear subframe 4 having the front-rear portion 4a (second front-rear portion) integrated with the inclined portion 4b (second inclined portion) is joined, in the front thereof, to the rear sideframe 2. Besides, the rear end of the side member 9 is located at the same position in the longitudinal direction as, or at a position posterior to, the rear end of the rear sideframe 2 (see FIG. 3).

In the vehicle rear structure S with such a feature, when the bumper beam 6 and the bumper beam extensions 6a are crushed to have an impact load inputted to the rear ends of the rear sideframes 2 at a rear impact with a vehicle, for example, the impact load is inputted to the rear ends of the side members 9 ahead of, or substantially at the same time as, the rear sideframes 2. Accordingly, in the vehicle rear structure S, both the rear sideframes 2 and the rear subframe 4 actively transmit the impact load frontward in the vehicle body 10. The vehicle rear structure S with such a feature further improves performance in absorbing impact energy, as compared with a conventional vehicle rear structure (see Japanese Patent Application Publication No. 2016-52862 A, for example) in which a rear subframe fails to work sufficiently as a load transmitting member for an impact load.

Still further, in the vehicle rear structure S of the present embodiment, the rear end 41a of the cross beam 41 (rear member) of the rear subframe 4 is located posterior to the rear ends of the pair of side members 9, as shown in FIG. 1.

In the vehicle rear structure S with such a feature, an impact load is inputted to the rear end 41a of the cross beam 41 (rear member) ahead of the rear ends of the side members 9 at a rear impact with a vehicle, for example. The vehicle rear structure S causes the impact load to be distributed to the respective side members 9 via the cross beam 41 (rear member). Accordingly, the vehicle rear structure S prevents an impact load from being inputted to only one of the right and left side members 9 at a rear impact with a vehicle, for example. Then, the vehicle rear structure S absorbs impact energy more effectively.

Still further, in the vehicle rear structure S of the present embodiment, the mount portion 11 is located posterior to the rear ends 4e of the side members 9, as shown in FIGS. 1 and 3.

In the vehicle rear structure S with such a feature, an impact load is inputted to the rigid mount portion 11 ahead of the rear ends of the side members 9 at a rear impact with a vehicle, for example. Accordingly, the impact load is more reliably inputted to the side members 9. The vehicle rear structure S with such a feature, impact energy is absorbed more effectively. Besides, the vehicle rear structure S allows the mount portion 11 to come into contact with a radiator or the like located posterior to a front bumper of an impacting vehicle, so that the impact load is transmitted via the mount portion 11 to the rear subframe 4 in an early stage.

Still further, the rear subframe 4 of the vehicle rear structure S has the extended portions 4c and inclined portions 4b of the rear subframe 4 joined, at the positions having the bent portions 19b therebetween, to the inclined portions 2b of the rear sideframes 2 and the rear cross member 3, respectively, as shown in FIG. 1. This leads to the vehicle rear structure S preventing the rear subframe 4 from being bent at the bent portions 19b. That is, the vehicle rear structure S actively transmits an impact load to the front of the vehicle body 10, by both the rear sideframes 2 and the rear subframe 4 for more reliablity.

Still further, the cross beam 42 disposed in front of the cross beam 41 in the vehicle rear structure S is joined to the inclined portions 4b so as to overlap with the sloped portions 18 of the side members 9, as shown in FIG. 1. This leads to an impact load inputted to the front-rear portions 4a of the side members 9 being more efficiently transmitted to the inclined portions 4b.

Hereinabove, the embodiment of the present invention has been described, but the present invention is not limited thereto and can be implemented in various forms. In the embodiment, the gusset 17 and the cross beam 42 of the rear subframe 4 are disposed so as to face each other in the up-down direction. Therefore, the present invention may be configured to have the gusset 17 joined to the cross beam 42 with a given joining member (not shown). This leads to an impact load inputted to the side member 9 being transmitted to the cross beam 42, the joining member (not shown), the gusset 17 and the rear cross member 3.

LEGEND FOR REFERENCE NUMERALS

1: side sill, 2: rear sideframe, 2a: front-rear portion of rear sideframe (first front-rear portion), 2b: inclined portion of rear sideframe (second inclined portion), 3: rear cross member, 3c: connection flange, 4: rear subframe, 4a: front-rear portion of rear subframe (second front-rear portion), 4b: inclined portion of rear subframe (second inclined portion), 4c: extended portion of rear subframe, 6: bumper beam, 6a: bumper beam extension, 7: bracket, 8: battery case, 9: side member, 10: vehicle body, 11: mount portion, 12: vehicle, 13: wheel arch, 14: constricted portion, 16a: front floor panel, 16a: rear floor panel, 17: gusset, 20a: first attachment portion, 20b: second attachment portion, 20c: third attachment portion, 20d: fourth attachment portion, 40a: first connection portion, 40b: second connection portion, 40c: third connection portion, 40d: fourth connection portion, 41: cross beam (rear member), 42: cross beam, B: bolt, and S: vehicle rear structure.

The invention claimed is:

1. A vehicle rear structure comprising:
a rear sideframe disposed on either side in a rear of a vehicle body; and
a rear subframe disposed under the rear sideframe,
wherein a rear end of the rear subframe is disposed at a position posterior to a rear end of the rear sideframe,
the rear subframe includes a pair of side members and a rear member joining the pair of the side members to each other,
a rear end of the rear member, formed to be convex rearward, is positioned posterior to rear ends of the pair of the side members,
the rear sideframe includes a first front-rear portion extending in a vehicle longitudinal direction, and a first inclined portion extending frontward from a front end of the first front-rear portion at an angle so as to be gradually displaced more outward in a vehicle width direction with an increasing distance from the front end of the first front-rear portion,
the rear subframe includes a second front-rear portion extending in a vehicle longitudinal direction, and a second inclined portion extending frontward from a front end of the second front-rear portion at an angle, so as to be gradually displaced more outward in the vehicle width direction with an increasing distance from the front end of the second front-rear portion, and being integrally joined to the second front-rear portion,
the second inclined portion is connected to the rear sideframe, and
the second front-rear portion extends along the first front-rear portion, and the second inclined portion extends along the first inclined portion, in a bottom view of the vehicle body.

2. The vehicle rear structure according to claim 1, wherein the second front-rear portion is joined to the first front-rear portion, and
the second inclined portion is joined to the first inclined portion.

3. The vehicle rear structure according to claim 2, comprising:
a side sill disposed on either side of the vehicle body,
wherein the rear sideframe has a front end of the first inclined portion joined to a rear end of the side sill, and has the first front-rear portion disposed at a higher level than the side sill, in a side view of the vehicle body, and
the second front-rear portion and the second inclined portion are disposed at the same height as the side sill, in a side view of the vehicle body.

4. The vehicle rear structure according to claim 2, wherein the second front-rear portion and the second inclined portion of the rear subframe, which are integrally joined to each other, form a side member, and
the side member has a front portion thereof joined to the rear sideframe, and has a rear end thereof disposed at the same position in the longitudinal direction as, or at a position posterior to, a rear end of the rear sideframe.

5. The vehicle rear structure according to claim 1, wherein the rear member is formed with a mount portion to have a drive unit mounted thereon, and
the mount portion is positioned posterior to the rear ends of the side members.

* * * * *